United States Patent
Ikeda (10) Patent No.: US 10,404,895 B2
(45) Date of Patent: Sep. 3, 2019

(54) IMAGING DEVICE AND IMAGING METHOD COMPRISING INTENSITY DETECTION OF YELLOW LIGHT, MAGENTA LIGHT AND CYAN LIGHT REFLECTED FROM A SUBJECT

(71) Applicant: NIDEC SANKYO CORPORATION, Suwa-gun, Nagano (JP)

(72) Inventor: Masahiro Ikeda, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 13 days.

(21) Appl. No.: 15/554,916

(22) PCT Filed: Aug. 3, 2016

(86) PCT No.: PCT/JP2016/072758
§ 371 (c)(1),
(2) Date: Aug. 31, 2017

(87) PCT Pub. No.: WO2017/026341
PCT Pub. Date: Feb. 16, 2017

(65) Prior Publication Data
US 2018/0152601 A1   May 31, 2018

(30) Foreign Application Priority Data
Aug. 11, 2015   (JP) .................... 2015-158775

(51) Int. Cl.
*H04N 1/48* (2006.01)
*H04N 1/04* (2006.01)
(Continued)

(52) U.S. Cl.
CPC ......... *H04N 1/484* (2013.01); *H04N 1/00798* (2013.01); *H04N 1/0282* (2013.01);
(Continued)

(58) Field of Classification Search
CPC ............. H04N 1/484; H04N 2209/044; H04N 1/00798; H04N 1/0282; G06T 1/00
(Continued)

(56) References Cited

U.S. PATENT DOCUMENTS 9,413,920 B2 *   8/2016   Depalov ................ H04N 1/028

FOREIGN PATENT DOCUMENTS

JP   62039958 A   2/1987
JP   08186741 A   7/1996
(Continued)

OTHER PUBLICATIONS

International Search Report for corresponding Application No. PCT/JP2016/072758; dated Sep. 27, 2016.

*Primary Examiner* — Que Tan Le
(74) *Attorney, Agent, or Firm* — Cantor Colburn LLP (57) ABSTRACT

An imaging apparatus for use with a subject may include a light source structured to irradiate the subject with a yellow light, a magenta light and a cyan light at a delayed illumination timing; and a plurality of photodetectors structured to detect the intensity of the light coming from the subject when the yellow light is irradiated, the intensity of the light coming from the subject when the magenta light is irradiated, and the intensity of the light coming from the subject when the cyan light is irradiated.

16 Claims, 6 Drawing Sheets (51) Int. Cl.
*H04N 1/60* (2006.01)
*H04N 5/225* (2006.01)
*H04N 1/00* (2006.01)
*H04N 1/028* (2006.01)
*H04N 1/191* (2006.01)

(52) U.S. Cl.
CPC ............... *H04N 1/04* (2013.01); *H04N 1/191* (2013.01); *H04N 1/48* (2013.01); *H04N 1/60* (2013.01); *H04N 5/225* (2013.01); *H04N 5/2256* (2013.01); *H04N 2209/044* (2013.01)

(58) Field of Classification Search
USPC .............................................. 250/208.1, 226
See application file for complete search history.

(56) References Cited

FOREIGN PATENT DOCUMENTS

| | | |
|---|---|---|
| JP | 08248529 A | 9/1996 |
| JP | 09261503 A | 10/1997 |
| JP | 2012249242 A | 12/2012 |

\* cited by examiner

IMAGING DEVICE AND IMAGING METHOD COMPRISING INTENSITY DETECTION OF YELLOW LIGHT, MAGENTA LIGHT AND CYAN LIGHT REFLECTED FROM A SUBJECT

CROSS REFERENCE TO RELATED APPLICATIONS

This is the U.S. national stage of application No. PCT/JP2016/072758, filed on Aug. 3, 2016. Priority under 35 U.S.C. § 119(a) and 35 U.S.C. § 365(b) is claimed from Japanese Applications No. 2015-158775, filed on Aug. 11, 2015; the disclosure of which are incorporated herein by reference.

FIELD OF THE INVENTION

At least an embodiment of the present invention relates to an imaging apparatus and an imaging method for capturing a color image of a subject.

BACKGROUND

A technology has been proposed in which, for imaging a subject such as a document, a subject is irradiated with a white light and the light coming from the subject is imaged by a television camera (Patent reference 1). To obtain a high resolution color image by such a technology, it is necessary to arrange photodetecting elements for three primary colors (a photodetecting element for red color, a photodetecting element for green color and a photodetecting element for blue color) with high density in a television camera. This may bring a problem that the imaging apparatus becomes expensive.

On the other hand, a technology has been proposed, in which a subject is irradiated with a red light, a green light and a blue light at a delayed irradiation timing, and a line sensor is scanned while detecting the intensity of the light coming from the subject when the red light is irradiated, the intensity of the light coming from the subject when the green light is irradiated and the intensity of the light coming from the subject when the blue light is irradiated with a monochromatic photodetecting element, which is mounted in the line sensor (Patent reference 2). According to this technology, one photodetecting element corresponds to the three primary colors even for obtaining high resolution color image; thus, the fewest number of photodetecting elements is required.

PATENT REFERENCE

[Patent reference 1] Unexamined Japanese Patent Application 8-186741 Publication
[Patent reference 2] Unexamined Japanese Patent Application 8-248529 Publication However, in the imaging apparatus described in Patent reference 2, three primary color illumination lights (a red light, a green light and a blue light) are subsequently turned on; therefore, if the illumination lights enter the eyes of an operator, the operator may become nauseous. This problem is probably caused because the retinal cone of a human eye has the functions specialized to sense each of the three primary colors individually; therefore, when the lights having the three primary colors enter the retina one after another, an intense stimulation is given to the cone.

SUMMARY

In view of the above, at least an embodiment of the present invention provides an imaging apparatus which can obtain color image data of a subject with monochromatic photodetecting elements, without using illumination lights of three primary colors, namely red light, green light and blue light, and its imaging method.

To achieve the above, the imaging apparatus of at least an embodiment of the present invention has an illumination device which illuminates a subject with a yellow light, a magenta light and a cyan light at a delayed illumination timing, and photodetecting elements which detect the intensity of the light coming from the subject when a yellow light is irradiated, the intensity of the light coming from the subject when a magenta light is irradiated, and the intensity of the light coming from the subject when a cyan light is irradiated.

The imaging method of at least an embodiment of the present invention is featured in that a subject is irradiated with a yellow light, a magenta light and a cyan light at a delayed illumination timing; when the yellow light is irradiated, the intensity of the light coming from the subject is detected; when the magenta light is irradiated, the intensity of the light coming from the subject is detected; when the cyan light is irradiated, the intensity of the light coming from the subject is detected.

In at least an embodiment of the present invention, a subject is irradiated with the yellow light, the magenta light and the cyan light at the delayed illumination timing, and the light coming from the subject when irradiated with the light of each color is detected by the photodetecting elements. Since yellow, magenta and cyan colors are secondary colors which are complementary to three primary colors (red, green and blue), the color data of the subject can be obtained from the results detected by the photodetecting elements. Therefore, by providing multiple photodetecting elements, the information of the color image of the subject can be obtained. Yellow color, magenta color and cyan color are three complementary colors; therefore, even when illumination lights enter the eyes of an operator, the retinal cone receives less intense stimulation. Thus, the problem of the operator becoming nauseous can be mitigated.

In the imaging apparatus of at least an embodiment of the present invention, a computation unit may be provided for calculating the red color intensity, the green color intensity and the blue color intensity of the lights that the photodetecting elements detect, based on the detection results by the photodetecting elements, and that the computation unit calculate the red color intensity based on the results detected by the photodetecting elements when the subjected is irradiated with the yellow light and the results detected by the photodetecting elements when the subject is irradiated with the magenta light, calculate the blue color intensity based on the results detected by the photodetecting elements when subject is irradiated with the magenta light and the results detected by the photodetecting elements when the subject is irradiated with the cyan light, and calculate the green color intensity based on the results detected by the photodetecting elements when the subject is irradiated with the cyan light and the results detected by the photodetecting elements when the subject is irradiated with the yellow light. Also, the imaging method of at least an embodiment of the present invention may have a computation process to calculate the red color intensity, the green color intensity and the blue color intensity of the lights, which the photodetecting element has detected, based on the result detected by the photodetecing elements, and that in the computation process, the red color intensity be calculated based on the results detected by the photodetecting elements when the subject is irradiated with the yellow light and the results detected by the photodetecting elements when the subject is irradiated with the magenta light, the blue color intensity be calculated based on the results detected by the photodetecting elements when the subject is irradiated with the magenta light and the results detected by the photodetecting elements when the subject is irradiated with the cyan light, and the green color intensity be calculated based on the results detected by the photodetecting elements when the subject is irradiated with the cyan light and the results detected by the photodetecting elements when the subject is irradiated with the yellow light. According to this configuration, the information of the color image of a subject can be obtained as the red color intensity, the green color intensity and the blue color intensity; therefore, it is useful to identify a subject, reproducing the color image of the subject, etc.

In at least an embodiment of the present invention, the illumination device may adopt an embodiment in which the subject is irradiated with a white color light at least before or after the period during which the yellow light, the magenta light and the cyan light are illuminated at the delayed irradiation timing. According to this configuration, even when the illumination lights enter the eyes of an operator, the stimulation to the cone can be lessened because the distinction of (or the change in) the colors is small. Thus, the problem of the operator becoming nauseous can be mitigated.

In at least an embodiment of the present invention, the subject may be irradiated with the white light when the color of the light to illuminate the subject is switched. According to this configuration, the distinction of (or the change in) the colors is small; therefore, even when the illumination lights enter the eyes of an operator, the stimulation to the cone can be lessened. Thus, the problem of the operator becoming nauseous can be mitigated.

In at least an embodiment of the present invention, the subject may be irradiated with the yellow light, the magenta light and the cyan light simultaneously to irradiate the subject with the white light. According to this configuration, there is no need to provide a separate white color light source.

It is effective that the illumination device of at least an embodiment of the present invention be a surface light source that irradiates the subject with the illumination light planarly and at least an embodiment of the present invention be applied to the configuration where multiple photodetecting elements are arranged in two directions which intersect with each other to configure a 2D image sensor. When the illumination device is a surface light source, particularly, the illumination lights leak and easily enter the eyes of an operator; however, according to at least an embodiment of the present, even when the illumination lights enter the eyes of an operator, the problem of the operator becoming nauseous can be mitigated.

At least an embodiment of the present invention may adopt a configuration in which the illumination device may be a linear light source that irradiates the subject with the illumination light linearly, the multiple photodetecting elements may be arranged in one direction to configure a 1D image sensor, and the 1D image sensor and an illumination area (or spot) of the illumination light is relatively scanned in the direction intersecting with the direction in which the illumination area (or spot) extends. In this case, the lights irradiated to the subject frequently switch between the yellow light, the magenta light and the cyan light; however, according to at least an embodiment of the present, even when the illumination lights enter the eyes of an operator, the cone receives less intensive stimulation. Thus, the problem of the operator becoming nauseous can be mitigated.

In at least an embodiment of the present invention, the illumination device may be equipped with a yellow light source for emitting yellow light, a magenta light source for emitting magenta light and a cyan light source for emitting cyan light. According to this configuration, the spectrum distribution of the illumination light does not easily deviate; therefore, the information of the color image of a subject can accurately be obtained.

In at least an embodiment of the present invention, the illumination device may adopt a configuration in which a red light source for emitting red light, a green light source for emitting green and a blue light source for emitting blue light are equipped. Even in this case, if the red light source and the blue light source are turned on together, a yellow light can be emitted; if the red light source and the green light source are turned on together, a magenta light can be emitted; if the red light source and the green light source are turned on together, a cyan light can be emitted. Also, if the light sources correspond to three primary colors (red, green and blue), even when the emitting intensity is high, the choice of light source can be increased, and thus relatively inexpensive [light sources] are possible.

In at least an embodiment of the present invention, a subject is irradiated with a yellow light, a magenta light and a cyan light at a delayed illumination timing, and the light coming from the subject when the light of each color is illuminated is detected by the photodetecting elements. Since yellow, magenta and cyan colors are three complementary colors of the three primary colors (red, green and blue), the color information of the subject can be obtained based on the detection results obtained by the photodetecting elements. Therefore, by providing multiple photodetecting elements, the information regarding the color image of a subject can be obtained. Because the yellow, magenta and cyan colors are three complementary colors, even when the illumination lights enter the eyes of an operator, the retinal cone receives less intensive stimulation. For this reason, the problem of the operator becoming nauseous can be mitigated.

BRIEF DESCRIPTION OF THE DRAWING

Embodiments will now be described, by way of example only, with reference to the accompanying drawings which are meant to be exemplary, not limiting, and wherein like elements are numbered alike in several Figures, in which.

DETAILED DESCRIPTION

An imaging apparatus and an imaging method to which at least an embodiment of the present invention is applied are described referring to the drawing.

Embodiment 1

Figure 1:
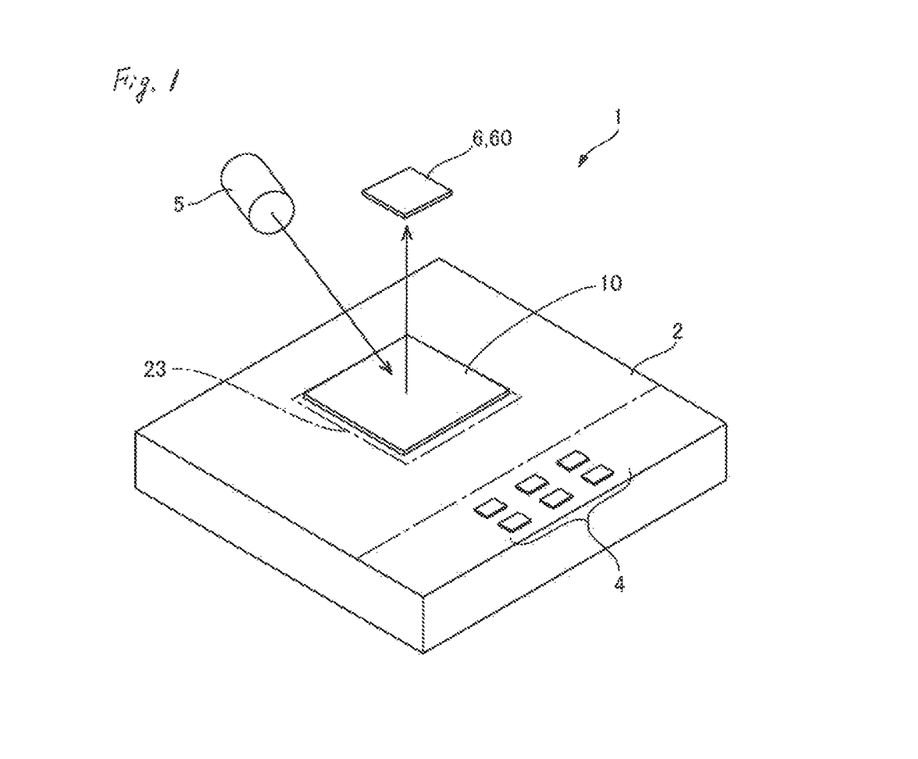
FIG. 1 An explanatory drawing of an imaging apparatus of at least an embodiment of the present invention.

FIG. 1 is an explanatory drawing of an imaging apparatus 1 of Embodiment 1 of the present invention. In the imaging apparatus shown in FIG. 1, an arrangement area 23, on which a subject 10 is to be arranged, is provided on the top surface of a case 2; in the arrangement area 23, the subject 10 is arranged having its surface, from which the color image is to be captured, face up. On the top surface of the case 2, switches 4 are provided to instruct the start of imaging, etc. In the upper part of the case 2, support members (no illustration) such as a frame, arm, etc. are provided; supported by the support members are an illumination device 5, which emits illumination lights diagonally toward the subject 10, and an image sensor 6 placed above the subject 10 for detecting the lights reflected on the subject 10. The illumination device 5 is arranged opposite from the switches 4 with respect to the arrangement area 23. Therefore, the illumination device 5 is positioned opposite from an operator with respect to the arrangement area 23.

In this embodiment, the illumination device 5 is a surface light source that irradiates the subject 10 with illumination lights planarly. The image sensor 6 is a 2D sensor in which multiple photodetecting elements 60, i.e., a plurality of photodetectors, are arranged in two directions intersecting with each other, to obtain 2D color images. In the image sensor 6, each of the multiple photodetecting elements 60 is a monochrome photodetecting element which is not provided with an optical color filter.

As described below referring to FIG. 2 and FIG. 3, the illumination device 5 of this embodiment irradiates a subject 10 with yellow light, magenta light and cyan light at a delayed illumination timing. In the image sensor 6, each of the multiple photodetecting elements 60 detects the intensity of the light reflected on and coming from the subject 10 when the illumination device 5 irradiates the subject 10 with the yellow light, detects the intensity of the light reflected on and coming from the subject 10 when the illumination device 5 irradiates the subject 10 with the magenta light, and detects the intensity of the light reflected and coming from the subject 10 when the illumination device 5 irradiates the subject 10 with the cyan light.

(Concrete Configuration Example of Imaging apparatus)

Figure 2:
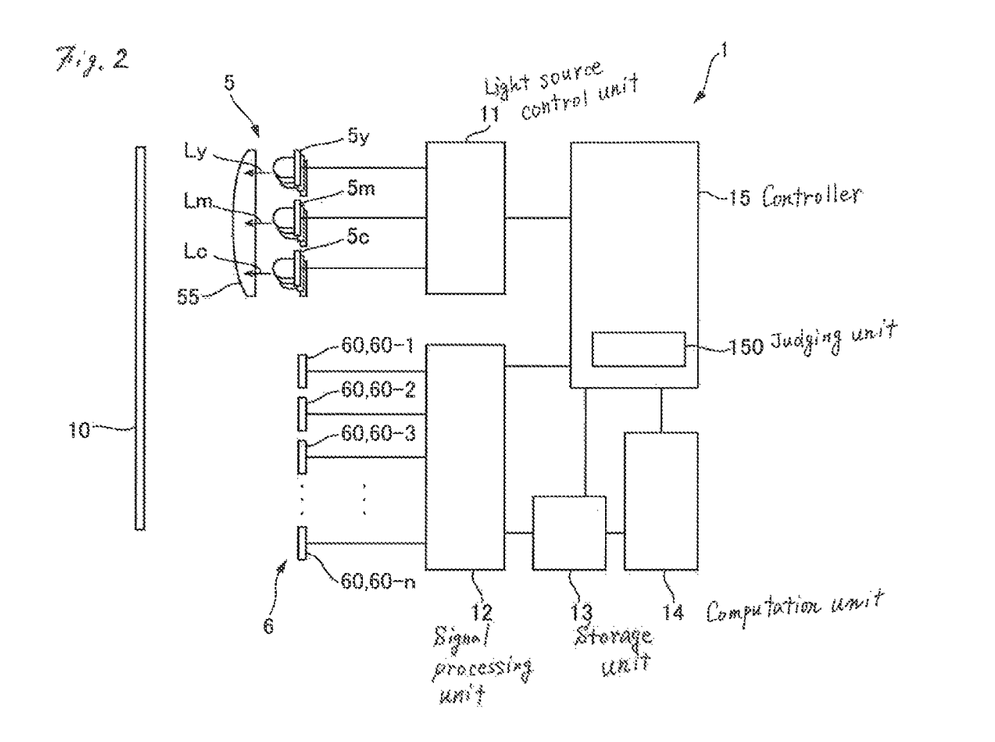
FIG. 2 A block diagram of the configuration of the imaging apparatus of at least an embodiment of the present invention.

FIG. 2 is a block diagram of the configuration of the imaging apparatus 1 of Embodiment 1 of the present invention. As shown in FIG. 2, the illumination device 5 in the imaging apparatus 1 of this embodiment is equipped with a yellow light source 5y for emitting yellow light Ly, a magenta light source 5m for emitting magenta light Lm, and a cyan light source 5c for emitting cyan light Lc. A photo diode or a laser device is used for the light sources (the yellow light source 5y, the magenta light source 5m and the cyan light source 5c). In this embodiment, the yellow light source 5y, the magenta light source 5m, and the cyan light source 5c are respectively composed of multiple photo diodes. Also, the illumination device 5 has an optical system 55 which synthesizes optical paths for the yellow light source 5y, the magenta light source 5m and the cyan light source 5c; the yellow light Ly emitted from the yellow light source 5y, the magenta light Lm emitted from the magenta light source 5m and the cyan light Lc emitted from the cyan light source 5c are irradiated on the same area of the subject 10.

A light source control unit 11 is provided to the illumination device 5; the light source control unit 11 turn on the yellow light source 5y, the magenta light source 5m and the cyan light source 5c in sequence at the delayed illumination timing and irradiates the subjects 10 with the yellow light Ly, the magenta light Lm and the cyan light Lc in sequence at the delayed illumination timing.

The image sensor 6 has multiple photodetecting elements 60 (photodetecting elements 60-1, 60-2, 60-3, . . . 60-n) which detect the light coming from each of the multiple sections of the subject 10 to obtain the 2D image of the subject 10.

The photodetecting elements 60 detect the intensity Ey of the light coming from the subject 10 when the illumination device 5 irradiates the subject 10 with the yellow light Ly, detects the intensity Em of the light coming from the subject 10 when the illumination device 5 irradiates the subject 10 with the magenta light Lm, and detects the intensity Ec of the light coming from the subject 10 when the illumination device 5 irradiates the subject 10 with the cyan light Lc. The operations are performed simultaneously at each of the multiple photodetecting elements 60-1, 60-2, 60-3, . . . 60-n.

The imaging apparatus 1 is provided with a signal processing unit 12 for converting the results detected by the image sensor 6 to digital signals, a storage unit 13 for storing the digital signals which are the conversions through the signal processing unit 12, and a computation unit 14, i.e., a processor, for calculating the red intensity Er, the green intensity Eg and the blue intensity Eb of the lights detected by the photodetecting elements 60, based on the signals stored in the storage unit 13.

In this embodiment, the data stored in the storage unit 13 is the intensity Ey of the yellow light Ly, the intensity Em of the magenta light Lm, and the intensity Ec of the cyan light Lc which are detected by each of the multiple photodetecting elements 60. The relationship between the intensities Ey, Em and Ec and the red intensity Er, the green intensity Eg and the blue intensity Eb respectively can be expressed below:

$$Er=Ey+Em$$

$$Eg=Ey+Ec$$

$$Eb=Em+Ec$$

Therefore, the computation unit 14 calculates the red intensity Er based on the addition result of the detection result by the photodetecting elements 60 (the intensity Ey) when the subject 10 is irradiated with the yellow light Ly and the detection result by the photodetecting elements 60 (the intensity Em) when the subject 10 is irradiated with the magenta light Lm. Also, the computation unit 14 calculates the blue intensity Eb based on the addition result of the detection result obtained by the photodetecting elements 60 (the intensity Em) when the subject 10 is irradiated with the magenta light Lm and the detection result obtained by the photodetecting elements 60 (the intensity Ec) when the subject 10 is irradiated with the cyan light Lc. Also, the computation unit 14 calculates the green intensity Eg based on the addition result of the detection result (the intensity Ec) obtained by the photodetecting elements 60 when the subject 10 is irradiated with the cyan light Lc and the detection result (the intensity Ey) obtained by the photodetecting elements 60 when the subject 10 is irradiated with the yellow light Ly.

Therefore, after the multiple photodetecting elements 60 obtain the color information of every section of the subject 10 as the intensity Ly of the yellow light, the intensity Em of the magenta light Lm and the intensity Ec of the cyan light Lc, the color information of every section of the subject 10 can be converted to the red intensity Er, the green intensity Eg and the blue intensity Eb at the computation unit 14.

The operation at the computation section 14 and the operation at the light source control unit 11 are implemented under the control of the controller 15, based on the program saved in a memory (no illustration) in advance.

(Operation)

Figure 3:
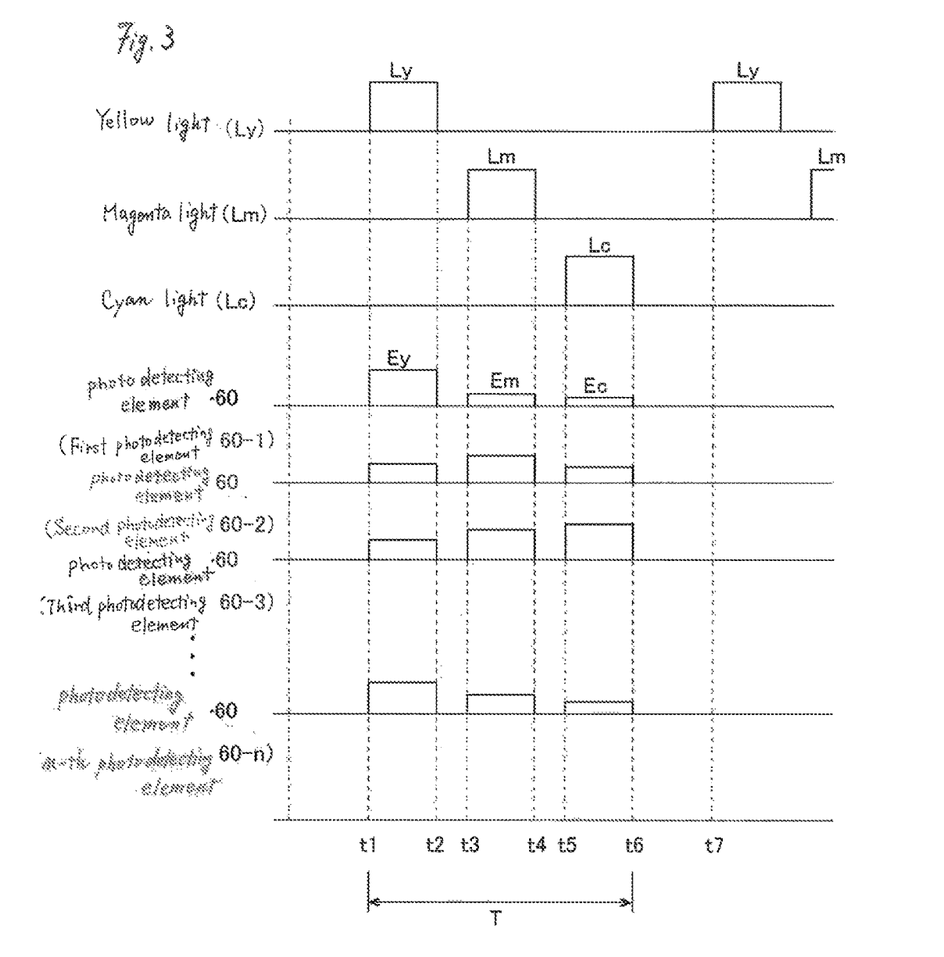
FIG. 3 A timing chart of the operation of the imaging apparatus of at least an embodiment of the present invention.

FIG. 3 is a timing chart of the operation of the imaging apparatus 1 of Embodiment 1 of the present invention. In the imaging apparatus 1 shown FIG. 1, in order to color-image the 2D image of the subject 10, the subject 10 is placed face up on the arrangement area 23. Then, the switches 4 are pressed to instruct the start of imaging. As a result, the light source control unit 11 turn on the yellow light source 5y, the magenta light source 5m and the cyan light source 5c of the illumination device 5 in sequence at a delayed illumination timing to irradiate the subject 10 with the yellow light Ly, the magenta light Lm and the cyan light Lc in sequence at the delayed timing. For instance, during the period from time t1 to time t2 shown in FIG. 3, the illumination device 5 irradiates the subject 10 with the yellow light Ly, and each of the multiple photodetecting elements 60 (multiple photodetecting elements 60-1, 60-2, 60-3, . . . 60-n) detects the intensity Ey of the light coming from each section of the subject 10. Next, during the period from time t3 to time t4, the illumination device 5 irradiates the subject 10 with the magenta light Lm, and each of the multiple photodetecting elements 60 (multiple photodetecting elements 60-1, 60-2, 60-3, . . . 60-n) detects the intensity Em of the light coming from each section of the subject 10. Then, during the period from time t5 to time t6, the illumination device 5 irradiates the subject 10 with the cyan light Lc, and each of the multiple photodetecting elements 60 (multiple photodetecting elements 60-1, 60-2, 60-3, . . . 60-n) detects the intensity Ec of the light coming from each section of the subject 10.

To color-image the 2D image of another subject 10, the subject 10 is replaced by the next subject 10 between time t6 and time t7 and the above operations are repeated after time t7.

Note that, although a no-operation period is set in between the period (between time t1 and time t2) during which the yellow light Ly is illuminated, the period (between time t3 and t4) during which the magenta light Lm is illuminated, and the period (between time t5 and time t6) during which the cyan light Lc is illuminated in the example of operation shown by FIG. 3, the yellow light Ly, the magenta light Lm and the cyan light Lc may be illuminated in sequence without the no-operation period between the periods.

(Major Effects of This Embodiment)

As described above, in the imaging apparatus 1 and the imaging method of this embodiment, the subject 10 is irradiated with the yellow light Ly, the magenta light Lm and the cyan light Lc at the delayed illumination timing, and the light which comes from the subject 10 when the light of each color is illuminated is detected by the photodetecting elements 60. Since yellow, magenta and cyan colors are the three colors in a complementary relationship with three primary colors, the color information of the subject 10 can be obtained according to the detection results obtained by the photodetecting elements 60. Therefore, based on the color information of the subject 10, obtained by the imaging apparatus 1, the color image of the subject 10 can be reproduced on a display device. Also, when the subject 10 is a passport, an ID card or a driver's license, the authenticity of the passport, ID card or driver's license can be verified by a judging unit 150 of the controller 15 or the like, by comparing the color information of the subject 10 obtained by the imaging apparatus 1 with the color information which has been saved in the storage unit 13.

Even in order to obtain [the image of] the subject 10 at high resolution by the imaging apparatus 1, the image sensor 6 detects the intensities Ey, Em and Ec of the yellow light Ly, the magenta light Lm and the cyan light Lc with the monochromatic photodetecting elements 60. Thus, since the photodetecting elements 60 can be arranged highly densely, the 2D color image of the subject 10 can be obtained at higher resolution, compared to the configuration in which the lights of different colors are detected by separate photodetecting elements.

When the red, green and blue lights are used to obtain the color information of the subject 10, if the red, green and blue lights reflect on the subject 10 and enter the eyes of an operator, [the operator's] retinal cone will receive an intense stimulation, therefore causing the operator to become nauseous. On the other hand, the yellow light Ly, the magenta light Lm and the cyan light Lc used as the illumination lights in this embodiment are the three complementary colors of three primary colors; therefore, even when the illumination lights enter the eyes of an operator, the operator's retinal cone receives less intense stimulation. Thus, the problem of the operator becoming nauseous can be mitigated. In this embodiment, in particular, the illumination device 5 is a surface light source; therefore, the illumination lights easily leak and enter the operator's eyes. However, according to this embodiment, even when the illumination lights enter the operator's eyes, the problem of [the operator] becoming nauseous can be mitigated.

Also, in this embodiment, the computation unit 14 implements the computation process to calculate the red intensity Er, the green intensity Eg and the blue intensity Eb, based on the detection results obtained by the photodetecting elements 60. For this reason, the information on the color image of the subject 10 can be obtained as the red intensity Er, the green intensity Eg and the blue intensity Eb; therefore, it is convenient for identifying the subject 10 or reproducing the color image of the subject 10.

Also, in this embodiment, the illumination device 5 is equipped with the yellow light source 5y, the magenta light source 5m and the cyan light source 5c; therefore, the spectrum distribution of the illumination lights does not easily deviate. In other words, two kinds of light sources (the red light source and the green light source) are turned on to emit the yellow light Ly, two kinds of light sources (the red light source and the blue light source) are turned on to emit the magenta light Lm, and two kinds of light sources (the green light source and the blue light source) are turned on to emit the cyan light Lc in the illumination device 5, but the spectrum distribution of the illumination lights may deviate due to the balance change of the emitting intensity of any two kinds of light sources, as described later. On the other hand, the spectrum distribution of the illumination lights does not easily deviate if the yellow light source 5y, the magenta light source 5m and the cyan light source 5c are used. Therefore, the information of the color image of the subject 10 can accurately be obtained.

Embodiment 2

Figure 4:
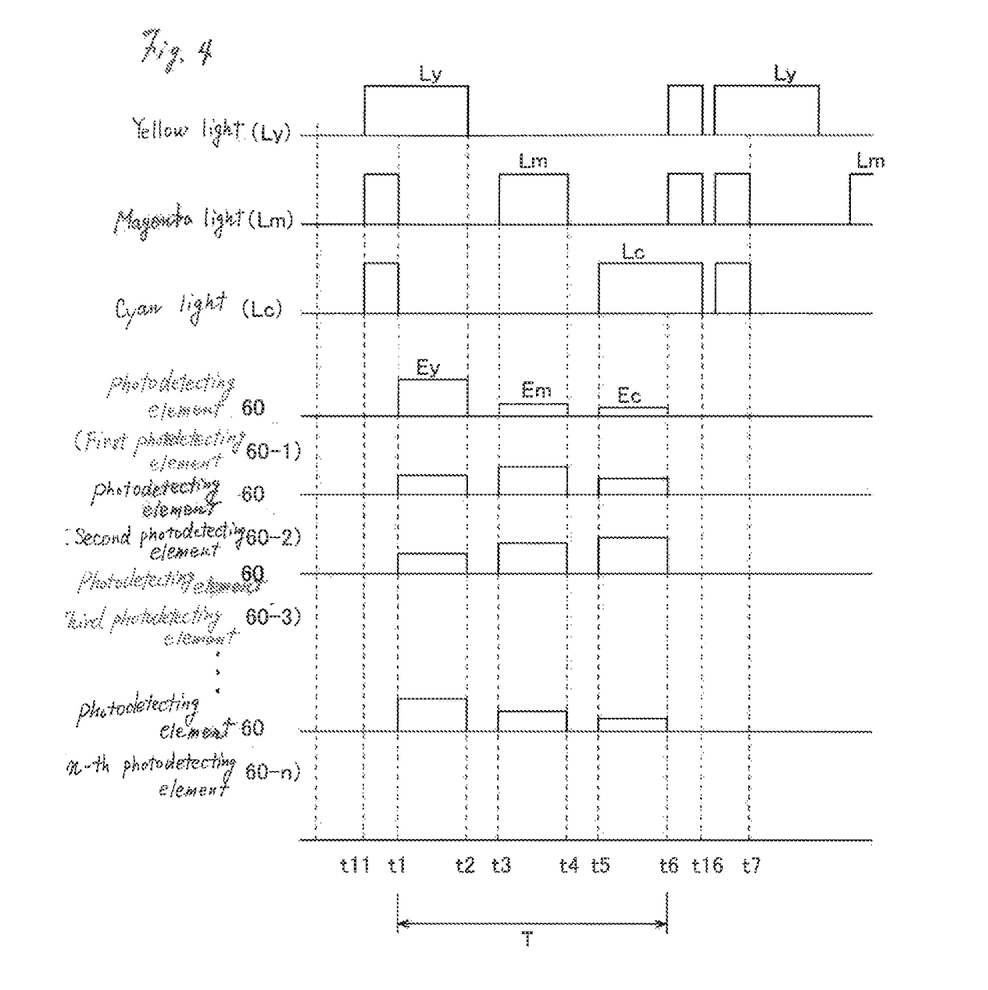
FIG. 4 A timing chart of the operation of an imaging apparatus of at least an embodiment of the present invention.

FIG. 4 is a timing chart of the operation of an imaging apparatus 1 of Embodiment 2 of the present invention. Note that the basic configuration of this embodiment and Embodiment 3, which is described later, is the same as that of Embodiment 1; therefore, the common portions are given the same codes and their descriptions are omitted.

As shown in FIG. 4, in this embodiment, the illumination device 5 irradiates the subject 10 with the yellow light Ly, the magenta light Lm and the cyan light Lc simultaneously during the time between t11 and t1 before the period T, during which the subject 10 is irradiated with the yellow light Ly, the magenta light Lm and the cyan light Lc at the delayed illumination timing. In other words, the subject 10 is irradiated with the white light between time t11 and t1. Also, the subject 10 is irradiated with the yellow light Ly, the magenta light Lm and the cyan light Lc simultaneously during the time between t6 and t16 after the period T, during which the illumination device 5 irradiates the subject 10 with the yellow light Ly, the magenta light Lm, and the cyan light Lc at the delayed illumination timing. That means that the subject 10 is irradiated with the white light between the time t6 and t16.

According to this configuration, the white light is first emitted from the illumination device 5 and then the yellow light Ly is emitted; therefore, even when the illumination lights enter the eyes of an operator, the change (or distinction) in colors is small. Also, the cyan light Lc is first emitted from the illumination device 5 and then the white light is emitted; therefore, even when the illumination lights enter the eyes of an operator, the change (or distinction) in colors is small. Therefore, the problem of the operator becoming nauseous can be mitigated. In order to irradiate the subject 10 with the white light, the illumination device 5 irradiates the subject 10 with the yellow light Ly, the magenta light Lm and the cyan light Lc simultaneously; therefore, it is not necessary to provide a white light source to the illumination device 5 separately.

Note that the subject 10 may be irradiated with the yellow light Ly, the magenta light Lm and the cyan light Lc simultaneously to be irradiated with the white light either before or after the period T, during which the illumination device 5 irradiates the subject 10 with the yellow light Ly, the magenta light Lm and the cyan light Lc at the delayed illumination timing.

In the operation example shown in FIG. 4, a no-illumination period takes place between the period (of time between t1 and t2) during which the yellow light Ly is illuminated, the period (of time between t3 and t4) during which the magenta light Lm is illuminated, and the period (of time between t5 and t6) during which the cyan light Lc is illuminated; however, the yellow light Ly, the magenta light Lm and the cyan light Lc may be illuminated in sequence without the no-illumination period in between.

Embodiment 3

Figure 5:
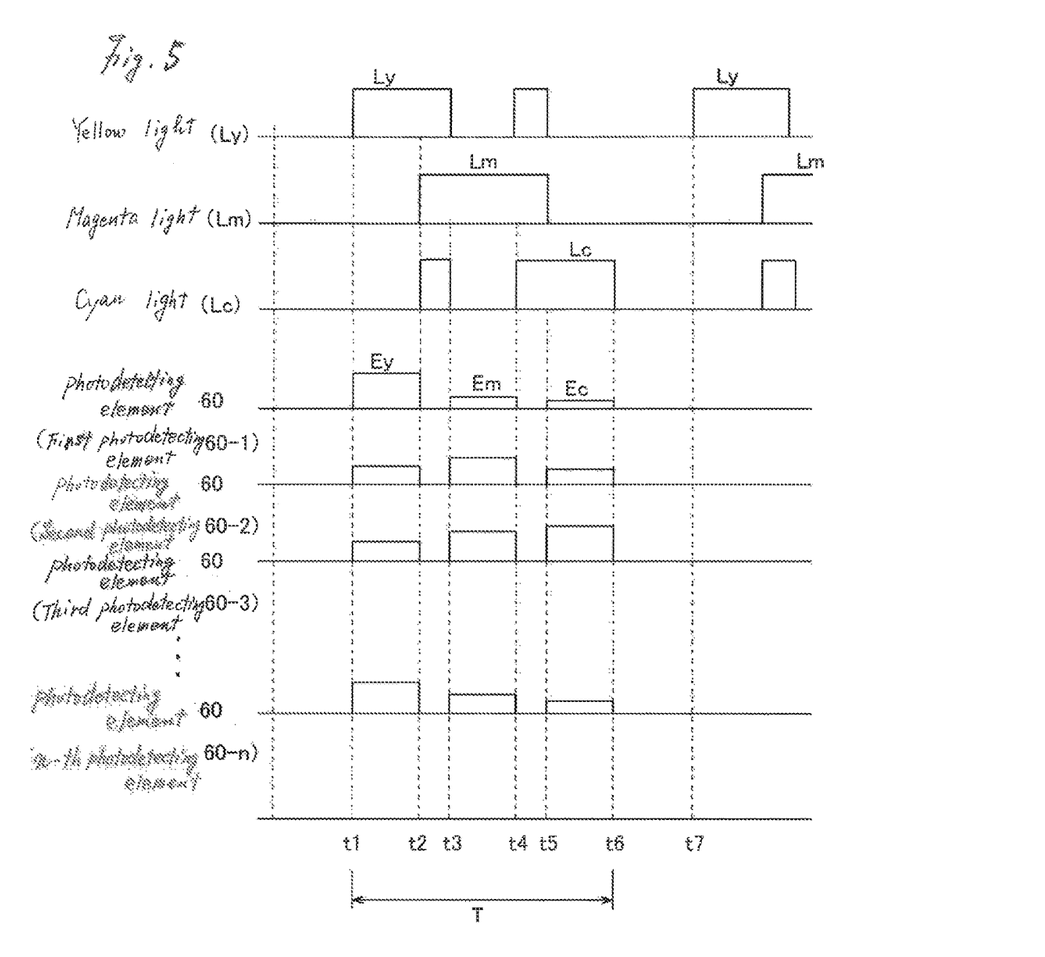
FIG. 5 A timing chart of the operation of an imaging apparatus of at least an embodiment of the present invention.

FIG. 5 is a timing chart of the operation of an imaging apparatus 1 of Embodiment 3 of the present invention. As shown in FIG. 5, in this embodiment, when the illumination device 5 switches the color of the light with which to irradiate the subject 10 (the period of time between t2 and t3, between t4 and t5), the subject 10 is irradiated with the yellow light Ly, the magenta light Lm and the cyan light Lc simultaneously. In other words, the subject 10 is irradiated with the white light during the periods between t2 and t3 and between t4 and t5. Therefore, the subject 10 is irradiated with the yellow light Ly, the white light, the magenta light Lm, the white light and the cyan light Lc in this order.

According to this configuration, every time the color of the light to irradiate the subject 10 is switched, the white light is emitted; therefore, even when the illumination lights enter the eyes of an operator, the change (or distinction) in colors is insignificant. Thus, even when the illumination lights enter the eyes of an operator, because the change (or distinction) in colors is insignificant, the problem of the operator becoming nauseous can be mitigated. In order to irradiate the subject 10 with the white light, the illumination device 5 irradiates the subject 10 with the yellow light Ly, the magenta light Lm and the cyan light Lc simultaneously; therefore, there is no need to provide a separate white light source to the illumination device 5.

Note that the form of this embodiment may be combined with that of Embodiment 2. For instance, when the illumination device 5 switches the color of the light with which to irradiate the subject 10 (the periods between t2 and t3 and between t4 and t5), the subject 10 is irradiated with the yellow light Ly, the magenta light Lm and the cyan light simultaneously both before (the period between t11 and t1) and after (the period between t6 and t16) the period T.

Embodiment 4

Figure 6:
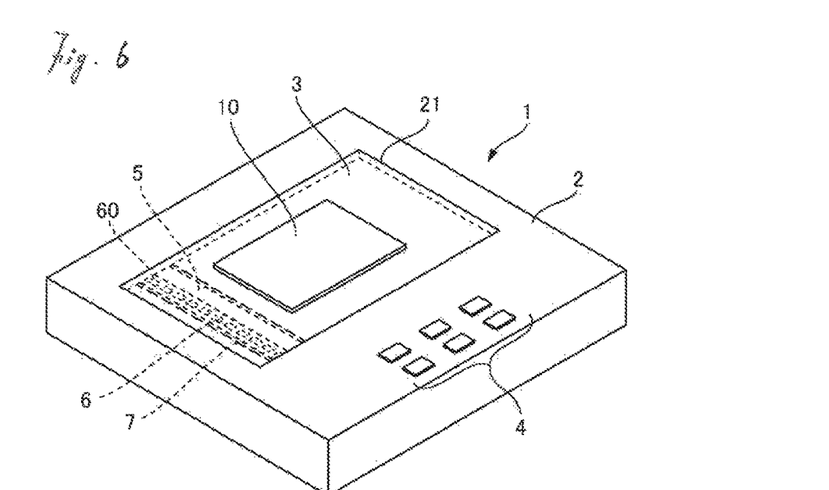
FIG. 6 An explanatory drawing of an imaging apparatus of at least an embodiment of the present invention.
Figure 7:
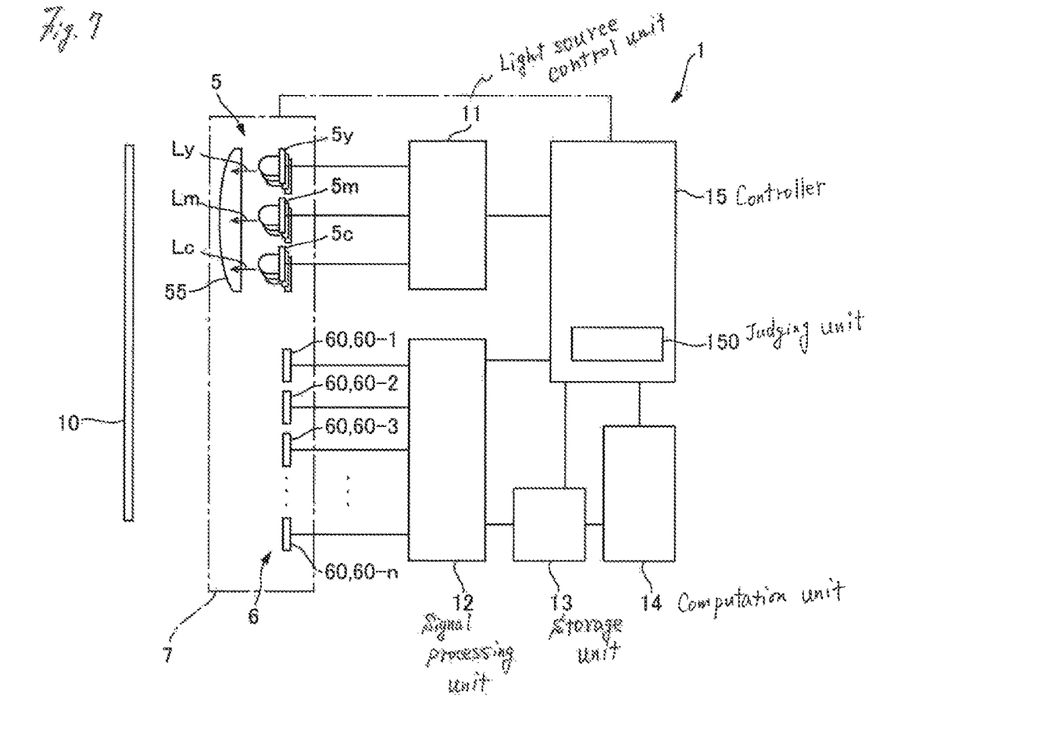
FIG. 7 A block diagram of the configuration of the imaging apparatus of at least an embodiment of the present invention.

FIG. 6 is an explanatory drawing of an imaging apparatus 1 of Embodiment 4 of the present invention. FIG. 7 is a block diagram of the configuration of the imaging apparatus of Embodiment 4 of the present invention. Note that the basic configuration of this embodiment is the same as that of Embodiment 1; therefore, the common portions are given the same codes for descriptions.

While the image sensor 6 of Embodiment 1 is a 2D image sensor, the image sensor 6 of the imaging apparatus 1 of this embodiment is configured by a 1D image sensor (a line sensor), as shown in FIG. 6. In this image sensor 6, the multiple photodetecting elements 60, which are described referring to FIG. 2, etc., are arranged in one direction. Also, while the illumination device 5 of Embodiment 1 is a surface light source, the imaging apparatus 1 of this embodiment uses a linear light source for the illumination device 5, as shown in FIG. 6. In this illumination device 5, the yellow light source 5y, the magenta light source 5m, the cyan light source 5c, which are described referring to FIG. 2, etc., are linearly arranged in one direction.

As shown in FIG. 6, the imaging apparatus 1 of this embodiment has a case 2 having an opening 21 formed in the top surface thereof and a translucent glass substrate 3 which covers the opening 21; on the top surface of the glass substrate 3, the subject 10 is placed having the surface thereof of the color image face down. Also, on the top surface of the case 2, the switches 4 are provided to instruct the start of imaging.

Placed inside the case 2 are the illumination device 5 for emitting illumination lights toward the subject 10 which is placed on the glass substrate and the image sensor 6 for detecting the lights reflected from the subject 10. In this embodiment, the illumination device 5 is a linear light source for linearly irradiating the subject 10 with the illumination lights; the image sensor 6 is a 1D image sensor in which multiple photodetecting elements 60 are arranged along the illumination device 5.

As shown in FIG. 6 and FIG. 7, the illumination device 5 and the image sensor 6 are mounted in a carriage 7, which makes the illumination device 5 and the image sensor 6 scan in the direction intersecting with the extending direction of the illumination area (spot) of the illumination light under the control of the controller 15.

The image sensor 6 here is provided at the position next to the illumination device 5 in the carriage 7. Therefore, when the illumination device 5 irradiates the subject 10 with the illumination lights, the image sensor 6 can detect the lights reflected from the subject 10. Also, as the illumination device 5 and the image sensor 6 are scanned, the irradiation area (spot) is also scanned over the subject 10 entirely; therefore, the image sensor 6 images the entire undersurface of the subject 10 which faces down toward the glass substrate 3 and obtains the 2D color image of the undersurface of the subject 10.

In the same manner as Embodiment 1, the illumination device 5 irradiates the same area of the subject 10 with the yellow light, the magenta light and the cyan light at the delayed illumination timing. Also, each of the multiple photodetecting elements 60 in the image sensor 6 is a monochromatic photodetecting element without an optical color filter. Therefore, when the illumination device 5 irradiates the same area of the subject 10 with the yellow light, each of the multiple photodetecting elements 60 detects the intensity of the light coming from every section of [the same area of] the subject 10; when the illumination device 5 irradiates the same area of the subject 10 with the magenta light, each photodetecting element 60 detects the intensity of the light coming from every section of [the same area of] the subject 10; when the illumination device 5 irradiates the same area of the subject 10 with the cyan light, each photodetecting element 60 detects the intensity of the light coming from each section [of the same area] of the subject 10. Therefore, the data saved in the storage unit 13 is the intensity Ey of the yellow light Ly in every scanning time period detected by each of the multiple photodetecting elements 60, the intensity Em of the magenta light Lm in every scanning time period detected by each of the multiple photodetecting elements 60 and the intensity Ec of the cyan light Lc in every scanning time period detected by each of the multiple photodetecting elements 60.

When a 2D image of the subject 10 is color-imaged in this imaging apparatus 1, the surface of the subject 10 to be imaged is pressed down to the glass substrate 3. Then, the switches 4 are pressed to instruct the start of imaging. As a result, the carriage 7 moves to the position which aligns with the edge of the subject 10. At that time, the illumination device 5 turns on the yellow light source 5y, the magenta light source Ly and the cyan light source Lc at the delayed illumination timing and irradiates the subject 10 with the yellow light Ly, the magenta light Lm and the cyan light Lc in sequence at the delayed illumination timing. For instance, during the time period between t1 and t2, the illumination device 5 irradiates the subject 10 with the yellow light Ly and each of the multiple photodetecting elements 60 (multiple photodetecting elements 60-1, 60-2, 60-3, . . . 60-n) detects the intensity Ey of the light coming from the subject 10. Next, During the time period between t3 and t4, the illumination device 5 irradiates the subject 10 with the magenta light Lm and each of the multiple photodetecting elements 60 (multiple photodetecting elements 60-1, 60-2, 60-3, . . . 60-n) detects the intensity Em of the light coming from the subject 10. During the time period between t5 and t6, the illumination device 5 irradiates the subject 10 with the cyan light Lc and each of the multiple photodetecting elements 60 (multiple photodetecting elements 60-1, 60-2, 60-3, . . . 60-n) detects the intensity Ec of the light coming from the subject 10. During these time periods between t1 and t2, between t3 and t4, and between t5 and t6, the carriage 7 may be halted or be moving at a constant speed. In this embodiment, the carriage 7 moves at a constant speed in the time periods between t1 and t2, between t3 and t4 and between t5 and t6.

After the time t7, the above operations are repeated, being coordinated with the movement of the carriage 7; as a result, each of the multiple photodetecting elements 60 obtains the color information of each section of the subject 10 as the intensity of the yellow light Ly, the intensity Em of the magenta light Lm and the intensity Ec of the cyan light Lc. Also, each of the detection results obtained by the multiple photodetecting elements is saved in the storage unit 13 as the intensity Ey of the yellow light Ly of the scanning time (at each of the multiple photodetecting elements 60), the intensity Em of the magenta light Lm of the scanning time at each of the multiple photodetecting elements 60 and the intensity Ec of the cyan light Lc of the scanning time at each of the photodetecting elements 60.

Then, the computation unit 14 calculates the red intensity Er, based on the detection results (the intensity Ey) obtained by the photodetecting elements 60 when the subject 10 is irradiated with the yellow light Ly and the detection results (the intensity Em) obtained by the photodetecting elements 60 when the subject 10 is irradiated with the magenta light Lm. Also, the computation unit 14 calculates the blue intensity Eb, based on the detection results (the intensity Em) obtained by the photodetecting elements 60 when the subject 10 is irradiated with the magenta light Lm and the detection results (the intensity Ec) obtained by the photodetecting elements 60 when the subject 10 is irradiated with the cyan light Lc. And the computation unit 14 calculates the green intensity Eg, based on the detection results (the intensity Ec) obtained by the photodetecting elements 60 when the subject 10 is irradiated with the cyan light Lc and the detection results (the intensity Ec) obtained by the photodetecting elements 60 when the subject 10 is irradiated with the yellow light Ly.

Thus, in the imaging apparatus 1 of this embodiment, the color information of each section of the subject 10 in the primary scanning direction and the secondary scanning direction is first obtained by the multiple photodetecting elements 60 as the intensity Ey of the yellow light Ly, the intensity of the magenta light Lm, and the intensity Ec of the cyan light Lc, and then in the computation process, the color information of each section of the subject 10 in the primary scanning direction and in the secondary scanning direction is converted to the red intensity Er, the green intensity Eg and the blue intensity Eb by the computation unit 14.

Note that, in the example of the operation shown in FIG. 3, an off-operation period takes place between the time period (between t1 and t2) during which the yellow light Ly is irradiated and the time period (between t3 and t4) during which the magenta light Lm is irradiated, and the time period (between t5 and t6) during which the cyan light Lc is irradiated; however, the yellow light Ly, the magenta light Lm and the cyan light Lc may be illuminated in sequence without having the off-operation period in between. Also, in the example of the operation shown in FIG. 3, the off-operation time period (between t11 to t1) takes place after the period T, during which the subject 10 is irradiated with the yellow light Ly, the magenta light Lm and the cyan light Lc at the delayed illumination timing; however, the period T, during which the subject 10 is irradiated with the yellow light Ly, the magenta light Lm and the cyan light Lc at the delayed illumination timing, may be repeated without having the off-operation period in between. Further, as described referring to FIG. 4 and FIG. 5, the subject 10 may be irradiated with the yellow light Ly, the magenta light Lm and the cyan light Lc simultaneously when the illumination device 5 switches the colors of the light with which to irradiate the subject 10 (time between t2 and t3, time between t4 and t5), before and after the period T (time between t11 and t1 and time between t6 and t16).

Even by the imaging apparatus 1 and the imaging method which is configured above, the image sensor 6 detects the intensities Ey, Em and Ec of the yellow light Ly, the magenta light Lm and the cyan light Lc with the monochromatic photodetecting elements 60 even to obtain the 2D color image of the subject 10 at high resolution in the imaging apparatus 1, in the same manner as Embodiment 1. For this reason, the photodetecting elements 60 can be arranged with high density, compared to the configuration in which each color of light is detected by a separate photodetecting element; thus, the same effect as Embodiment 1 can be obtained in being suitable for obtaining the 2D color image of the subject 10 at high resolutions. Also, when the red, green and blue lights are used to obtain the color information of the subject 10 and if the lights of the red, green and blue color leak and enter the eyes of an operator at a predetermined period, the operator's retinal cone is strongly stimulated and therefore, nausea is caused. On the other hand, the yellow light Ly, the magenta light Lm and the cyan light Lc used as the illumination lights in this embodiment are three complementary colors; therefore, even when the illumination lights enter the operator's eyes at a certain period, the retinal cone receives only weak stimulation. For this reason, the problem of the operator becoming nauseous can be mitigated. Also, in this embodiment, the illumination device 5 is a linear light source that irradiates the subject 10 with the illumination lights linearly, and the subject 10 and the illumination area (or spot) of the illumination light are relatively scanned in the direction intersecting with the extending direction of the illumination area. For this reason, even when the lights to be irradiated to the subject 10 are often switched among the yellow light Ly, the magenta light Lm and the cyan light Lc and the illumination lights enter the eyes of an operator, only weak stimulation is caused to the [operator's retinal] cone in this embodiment. Thus, the problem of the operator becoming nauseous can be mitigated.

Other Embodiment

Even in Embodiment 1, the translucent glass substrate 3 may be provided to cover the opening 21 in the case 2, and the illumination device 5 and the image sensor 6 may be arranged at the bottom of the glass substrate 3 as in Embodiment 4. With this configuration, the subject 10 is placed on the top surface (the outside surface) of the glass substrate 3 having the surface thereof, whose color image is to be captured, face down. Even in Embodiment 4, a configuration may be adopted in which the subject 10 is placed having the surface thereof, whose color image is to be captured, face up.

In the above embodiments, the illumination device 5 is provided with the yellow light source 5y, the magenta light source 5m and the cyan light source 5c; however, a red light source for emitting a red light, a green light source for emitting a green light and a blue light source for emitting a blue light may be provided. According to this configuration, the red light source and the green light source are turned on to emit the yellow light Ly; the red light source and the blue light source are turned on to emit the magenta light Lm; the green light source and the blue light source are turned on to emit the cyan light Lc. Also, as long as the light sources correspond to the three primary colors (red, green and blue), even if the emission intensity is high, the choice of light source is increased, thus making relatively inexpensive [light sources] possible.

Also, the illumination device 5 may be provided with a white light source and a color wheel, and a yellow color filter, a magenta color filter and a cyan color filter may be provided to the color wheel in the circumferential direction. With this configuration, when the light emitted from the white light source is made to enter the color wheel, the yellow light Ly, the magenta light Lm and the cyan light Lc are emitted in sequence as the color wheel rotates.

In the above embodiments, the yellow light Ly, the magenta light Lm and the cyan light Lc are emitted in this order; however, the illumination lights may be emitted in the following order:

Yellow light Ly—Cyan light Lc—Magenta light Lm
Magenta light Lm—Cyan light Lc—Yellow light Ly
Magenta light Lm—Yellow light Ly—Cyan light Lc
Cyan light Lc—Yellow light Ly—Magenta light Lm
Cyan light Lc—Magenta light Lm—Yellow light Ly In the above embodiments, when the illumination device 5 irradiates the subject 10 with the white light, the subject 10 is irradiated with the yellow light Ly, the magenta light Lm and the cyan light Lc simultaneously; however, a white light source may be provided to the illumination device 5 to irradiate the subject 10 with the white light.

In the above embodiments, the light reflected on and coming from the subject 10 is detected by the photodetecting elements 60; however, at least an embodiment of the present invention may be applied to an imaging apparatus 1 or an imaging method in which the light, transmitted through and coming out from the subject 10, may be detected by the photodetecting elements 60.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. An imaging apparatus for use with a subject, the imaging apparatus comprising:
   a light source structured to irradiate the subject with a yellow light, a magenta light and a cyan light at a delayed illumination timing; and
   a plurality of photodetectors structured to detect the intensity of the light coming from said subject when said yellow light is irradiated, the intensity of the light coming from said subject when said magenta light is irradiated, and the intensity of the light coming from said subject when said cyan light is irradiated.

2. The imaging apparatus as set forth in claim 1, further comprising:
   a processor configured to calculate, based on the detection results obtained by said plurality of photodetectors, the red intensity, the green intensity and the blue intensity of the lights which said plurality of photodetectors has detected;

wherein said processor is configured to calculate said red intensity based on the detection results obtained by said plurality of photodetectors when said subject is irradiated with said yellow light and the detection results obtained by said plurality of photodetectors when said subject is irradiated with said magenta light, said blue intensity based on the detection results obtained by said plurality of photodetectors when said subject is irradiated with said magenta light and the detection results obtained by said plurality of photodetectors when said subject is irradiated with said cyan light, and said green intensity based on the detection results obtained by said plurality of photodetectors when said subject is irradiated with said cyan light and the detection results obtained by said plurality of photodetectors when said subject is irradiated with said yellow light.

3. The imaging apparatus as set forth in claim 1, wherein said light source is structured to irradiate said subject with a white light at least before or after a period during which said yellow light, said magenta light and said cyan light are irradiated at a delayed illumination timing.

4. The imaging apparatus as set forth in claim 1, wherein said light source is structured to irradiate said subject with a white light when switching the color of the light with which to irradiate said subject.

5. The imaging apparatus as set forth in claim 3, wherein said light source is structured to irradiate said subject with said yellow light, said magenta light and said cyan light simultaneously to irradiate said subject with said white light.

6. The imaging apparatus as set forth in claim 1, wherein said light source is a surface light source which is structured to irradiate said subject with an illumination light planarly, and
Said plurality of photodetectors are arranged in plural in two directions intersecting with each other to configure a 2D image sensor.

7. The imaging apparatus as set forth in claim 1, wherein said light source is a linear light source which irradiates said subject with an illumination light linearly;
said plurality of photodetectors are arranged in one direction to configure a 1D image sensor; and
said 1D image sensor and an illumination area of said illumination light are relatively scanned in the direction intersecting with the extending direction of said illumination area over said subject.

8. The imaging apparatus as set forth in claim 1, wherein said light source comprises a yellow light source for emitting said yellow light, a magenta light source for emitting said magenta light and a cyan light source for emitting said cyan light.

9. The imaging apparatus as set forth in claim 1, wherein said light source comprises a red light source for emitting a red light, a green light source for emitting a green light and a blue light source for emitting a blue light.

10. An imaging method for use with a subject, the method comprising:

Irradiating the subject with a yellow light, a magenta light and a cyan light with a light source at a delayed illumination timing, and
detecting, with a plurality of photodetectors, the intensity of the light coming from said subject when said yellow light is irradiated, the intensity of the light coming out of said subject when said magenta light is irradiated, and the intensity of the light coming out of said subject when said cyan light is irradiated.

11. The imaging method as set forth in claim 10, further comprising: calculating a red intensity, a green intensity and a blue intensity of the light detected by said plurality of photodetectors, based on the detection results by said plurality of photodetectors;
wherein, in said calculating, said red intensity is calculated based on the detection results obtained by said plurality of photodetectors when said subject is irradiated with said yellow light, said blue intensity is calculated based on the detection results obtained by said plurality of photodetectors when said subject is irradiated with said magenta light and the detection results obtained by said plurality of photodetectors when said subject is irradiated with said cyan light, and said green intensity is calculated based on the detection results obtained by said plurality of photodetectors when said subject is irradiated with said cyan light and the detection results obtained by said plurality of photodetectors when said subject is irradiated with said yellow light.

12. The imaging method as set forth in claim 10, wherein said light source irradiates said subject with a white light at least before or after a period during which said yellow light, said magenta light and said cyan light are irradiated at a delayed illumination timing.

13. The imaging method as set forth in claim 10, wherein said light source irradiates said subject with a white light at the time of switching the color of light with which to irradiate said subject.

14. The imaging method as set forth in claim 12, wherein said yellow light, said magenta light and said cyan light are simultaneously illuminated to irradiate said subject with said white light.

15. The imaging method as set forth in claim 10, wherein said light source is a surface light source which irradiates said subject with illumination light planarly;
said multiple plurality of photodetectors are arranged in multiple in two directions, which intersects with one another, to configure a 2D image sensor.

16. The imaging method as set forth in claim 10, wherein said light source is a linear light source which irradiates said subject with illumination light linearly;
said multiple plurality of photodetectors are arranged in multiple in one direction to configure a 1D image sensor; and
said 1D image sensor and an irradiation area of said illumination light are relatively scanned on said subject in the direction intersecting with the extending direction of said irradiation area relatively.

* * * * *